No. 648,541. Patented May 1, 1900.
C. E. VAIL.
BICYCLE SADDLE CARRIAGE.
(Application filed June 22, 1899.)
(No Model.) 2 Sheets—Sheet 1.
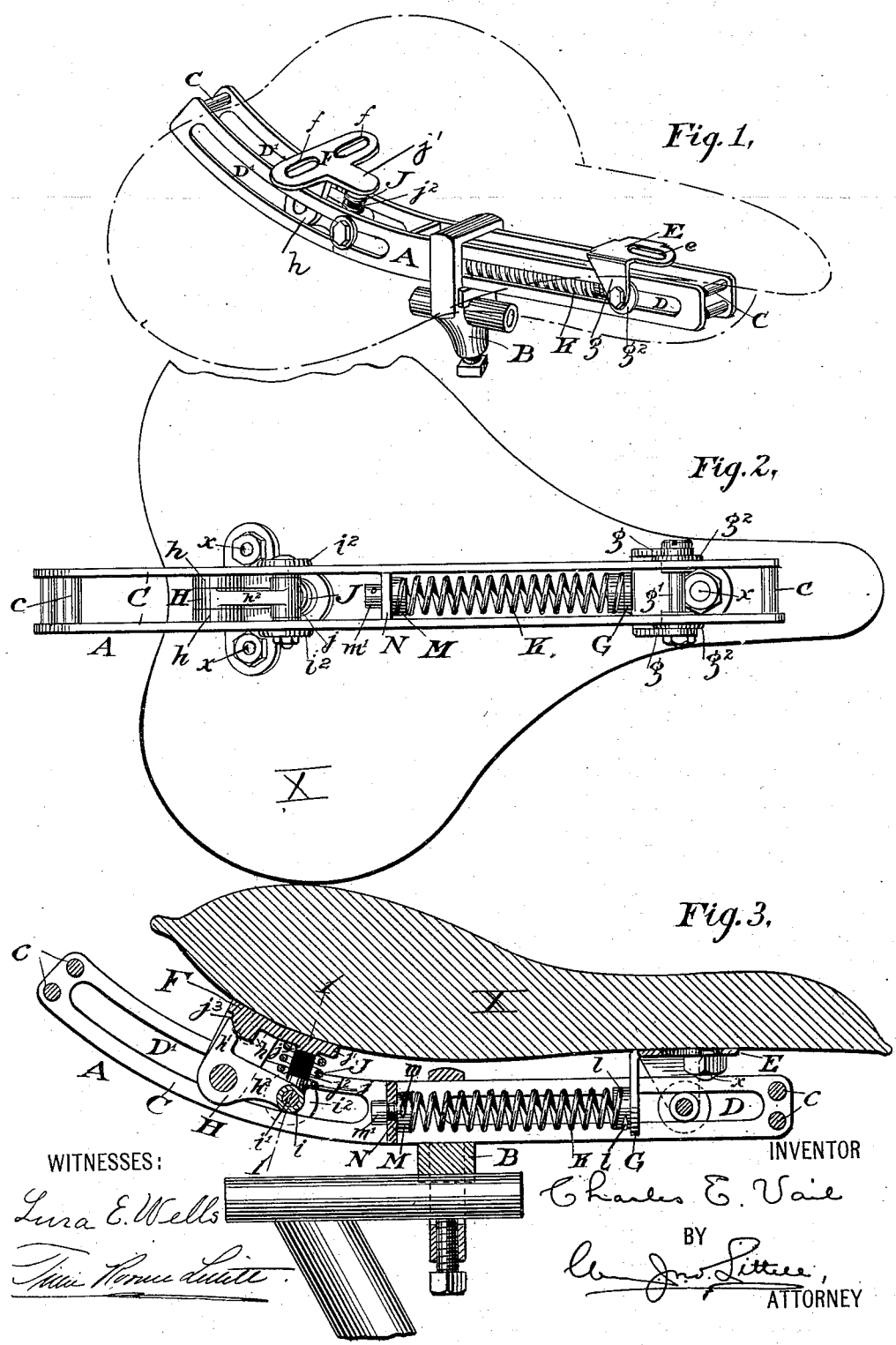

No. 648,541. Patented May 1, 1900.
C. E. VAIL.
BICYCLE SADDLE CARRIAGE.
(Application filed June 22, 1899.)
(No Model.) 2 Sheets—Sheet 2.
*Fig. 4.*
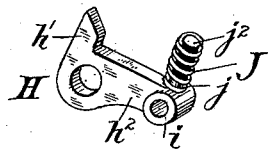
*Fig. 6,*
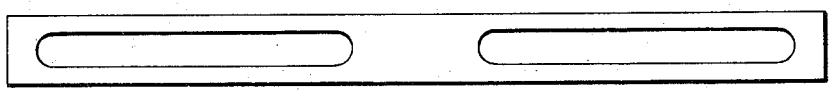
*Fig. 5,*
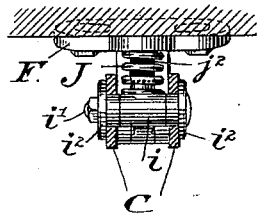
WITNESSES: INVENTOR
Lura E. Wells. Charles E. Vail
BY
ATTORNEY
THE NORRIS PETERS CO., PHOTO-LITHO., WASHINGTON, D. C.

UNITED STATES PATENT OFFICE.

CHARLES E. VAIL, OF BRIDGEPORT, CONNECTICUT.

BICYCLE SADDLE-CARRIAGE.

SPECIFICATION forming part of Letters Patent No. 648,541, dated May 1, 1900.

Application filed June 22, 1899. Serial No. 721,440. (No model.)

*To all whom it may concern:*

Be it known that I, CHARLES E. VAIL, a citizen of the United States, residing at Bridgeport, in the county of Fairfield and State of Connecticut, have invented certain new and useful Improvements in Bicycle Saddle-Carriages; and I do hereby declare that the following is a full, clear, and exact description of the invention, which will enable others skilled in the art to which it appertains to make and use the same.

This invention relates to bicycle saddle-carriages of that class which are designed to impart a forward and rearward yielding movement to the saddle; and it has for its object to provide a simple and improved carriage of this class embodying supplementary means for imparting an automatic vertical yielding of the rear part of the saddle independent of the forward and rearward movement.

To this end my invention consists of a saddle-carriage designed to compensate for and relieve all jar or concussion to the bicycle in both a longitudinal or a vertical direction and at the same time insure a comfortable and uniform seat to the rider under varying conditions.

In the drawings, Figure 1 is a perspective view of a bicycle saddle-carriage embodying my invention, the saddle being shown in dotted lines. Fig. 2 is a bottom or inverted plan view, the clamp for attaching the carriage to the saddle-post being removed. Fig. 3 is a vertical longitudinal sectional view taken centrally through the saddle and carriage. Fig. 4 is a detail perspective view of the device for imparting a vertical yielding movement to the saddle. Fig. 5 is a vertical transverse sectional view taken on the line 1 1, Fig. 3. Fig. 6 is a side elevation of a modified form of the guide-bars.

Corresponding parts in all the figures are denoted by the same letters of reference.

Referring to the drawings, A designates the stationary frame of the carriage, which is designed to be attached to the saddle-post by means of a clamp B and which may be of the construction shown or of other suitable pattern for attaching the carriage to a straight or T form of post, as desired.

The frame A comprises two longitudinal guide-bars C C, preferably constructed of strip-steel and arranged parallel to each other throughout their length. The rear and forward ends of these bars are rigidly connected together by pins $c$ or by bolts or other suitable means. When in position, the forward portions of the bars C (about one-half their length) are located in approximately a horizontal plane, while the rear portions of the bars are correspondingly upwardly curved, describing the arc of a circle. In the forward sections of these bars coincident longitudinal slots D D are provided, while in the rear sections of said bars are provided coincident longitudinal slots D' D', conforming in contour to the curvature of said rear sections, said slots D and D' serving as guideways for the yielding section.

The yielding section of the carriage comprises a forward longitudinally-arranged plate E and a rear plate F, located at right angles thereto, said plates being adapted to be attached to the forward and rear securing-bolts $x$ of a saddle X. To this purpose the plate E is provided with an elongated slot $e$ and the plate F with elongated slots $ff$, one at each end, said slots receiving the securing-bolts $x$. By this means the carriage is adapted for attachment to saddles of different patterns, the elongated slots allowing for different relative positions of the securing-bolts $x$.

The plate E is provided at its sides with two parallel depending arms $g\ g$, located at right angles to the plate and which carry a shaft $g'$, having mounted thereon two flanged rollers $g^2\ g^2$, registering with and working in the slots D. The plate E is further provided with a central depending arm G, the purpose of which will hereinafter appear.

Depending from the plate F are two parallel arms $h\ h$, between which is pivoted an approximately right-angular lever H, the fulcrum of the latter being at the angle thereof, one of the arms, $h'$, of said lever projecting upwardly between the arms $h$ and the other arm, $h^2$, extending forwardly. At the free end of the arm $h^2$ the latter is provided with a transverse horizontal sleeve $i$, through the bore of which passes a shaft $i'$, carrying flanged rollers $i^2\ i^2$, registering with and working in the slots D'. By reason of this construction it will be seen that the rear portion of the saddle has a vertical yielding movement entirely independent of any longitudinal movement. To control this vertical movement and return the saddle to its normal vertical position, I provide a coil-spring J, which is held between two coincident studs $jj$, carried, respectively, by the arm $h^2$ of the lever and by a lug $j'$, projecting forwardly from the plate F. Interposed within the spring J, between the studs $j$, is a rubber cushion $j^2$, which serves to further restrict the downward movement of the saddle and more readily effect the return of the latter to normal position. If desired, however, the cushion $j^2$ may be dispensed with. To limit the upward play of the spring J, a stop-lug $j^3$ is provided between the arms $h$, with which the upper end of the arm $h'$ of the lever H contacts.

For controlling the longitudinal movement of the saddle I provide a coil-spring K, disposed between the forward portions of the side bars C. The forward end of this spring is firmly secured to a stud L, projecting rearwardly from the arm G of the plate E, said stud having a spiral groove $l$, with which the opposing end coils of the spring register. Upon the rear end of the spring is mounted a nut M, having a spiral groove $m$, by means of which it is securely attached to the spring. This nut is secured by means of a screw or bolt $m'$ to a transverse plate N, which is secured between the bars C at about their centers. When the carriage is in normal position, the bearing-rollers are in rear of the forward ends of the bearing-slots, as shown. Thus by securing the spring K at both ends the tension thereof is utilized in both directions by compression and by draft during recoil.

In practice the spring K is of less resisting power than the combined spring J and cushion $j^2$ or in instances where the spring J is used without the cushion of less resisting power than said latter spring. The object of this is that the downward yielding of the rear end of the saddle will not equal the elevation of the latter in its rearward movement.

The operation and advantages of my invention will be readily understood by those skilled in the art to which it appertains. When pressure is applied to the pedals by the rider, the saddle is caused to yield rearwardly against the tension of the spring K, and in its rearward movement the rear portion of the saddle rides upwardly in rear of the rider, thus insuring a secure and comfortable seat under varying conditions. It will be obvious that the greater the draft upon the pedals the farther to the rear the saddle yields and the higher rides the rear of the saddle, obviating the tendency of the rider to slip therefrom when great pressure is necessary to propel the bicycle. By reason of the longitudinal yielding of the saddle all jolting or jarring in a corresponding plane, caused by the sudden lessening of the speed of the bicycle by contact with obstructions or rough road-surfaces, is compensated for, relieving both the rider and bicycle from the usual constant shock and strain. Jolting and jarring in a vertical plane and the objectionable results incident thereto are likewise compensated for by the vertical yielding of the rear part of the saddle. It should be noted, however, that owing to the difference in resistance of the controlling-springs the vertical yielding referred to does not equal the elevation of the rear end of the saddle, but is designed to be merely sufficient to compensate for any vertical shock in riding. If desired, however, the play of the vertically-yielding spring may be increased or diminished, as circumstances suggest.

I do not wish to be understood as limiting myself to the precise construction herein shown and described, but reserve to myself the right to all such modifications as properly fall within the spirit and scope of my invention. For example, in some instances the guide-bars C may be continued straight throughout their length instead of being curved upwardly at the rear ends, as shown in Fig. 6.

I claim as my invention—

1. In a bicycle saddle-carriage, the combination, with a section provided near its forward ends with approximately horizontally arranged guideways, and near its rear ends with guideways extending upwardly and rearwardly, and a second section provided with bearings loosely received by said guideways, one of said sections being adapted to carry a saddle, of means for effecting independent vertical yielding of the rear portion of the saddle; substantially as set forth.

2. In a bicycle saddle-carriage, the combination, with a stationary section provided near its forward ends with guide-slots, and near its rear ends with upwardly-curved guide-slots arranged in a different plane from said forward guide-slots, and a longitudinally-yielding section provided with bearing-rollers working in said guide-slots, of means for effecting independent vertical yielding of the rear portion of said longitudinally-yielding section; substantially as set forth.

3. In a bicycle saddle-carriage, the combination, with a section provided near its forward ends with approximately horizontally arranged guideways, and near its rear ends with guideways extending upwardly and rearwardly, a second section provided with bearings loosely received by said guideways, one of said sections being adapted to carry a saddle, and mechanism for controlling the movement of the saddle-carrying section, of means for effecting independent vertical yielding of the saddle; substantially as set forth.

4. In a bicycle saddle-carriage, the combination, with a stationary section, and a longitudinally-yielding section working thereon, of an approximately right-angular lever fulcrumed at its angle to the rear portion of said yielding section, one of the arms of said lever projecting forwardly and having pivotal connection at its free end with said stationary section, the remaining arm of the lever projecting upwardly and being adapted to engage a stop carried by the yielding section in advance of said arm, and means for controlling the movement of said arm; substantially as set forth.

5. In a bicycle saddle-carriage, the combination, with a stationary section, and a longitudinally-yielding section working thereon, the rear end of said yielding section being provided with two depending arms and a forwardly-projecting lug, of an approximately right-angular lever fulcrumed at its angle between said depending arms, one of the arms of the lever projecting forwardly and having pivotal connection at its free end with the stationary section and the other arm upwardly, and a coil-spring interposed between the forwardly-projecting arm of the lever and said lug; substantially as set forth.

6. A bicycle saddle-carriage comprising a stationary section, a section carrying a saddle and provided at its rear end with two depending arms and a forwardly-projecting lug, an approximately right-angular lever pivoted between said arms, and having one of its arms projecting upwardly and adapted to engage a stop located forward thereof, the other arm of the lever projecting forwardly and being pivotally connected with the stationary section, and a cushion interposed between the forwardly-projecting arm of the lever and said lug; substantially as and for the purpose set forth.

7. As an improvement in bicycle saddle-carriages, a section provided at its forward end with a longitudinally-arranged securing-plate having a longitudinally-elongated slot, and at its rear end with a transversely-arranged securing-plate having at each end an elongated slot extending in a longitudinal plane relative to said plate; substantially as and for the purpose set forth.

8. In a bicycle saddle-carriage, the combination, with a stationary section, a longitudinally-yielding section carrying a saddle and adapted to elevate the rear end of the latter during its rearward movement, and means for controlling the movement of the yielding section, of a device for effecting vertical yielding of the rear end of said yielding section, said device being of greater resistance than the means for controlling the longitudinal movement of the yielding section; substantially as and for the purpose set forth.

9. In a bicycle saddle-carriage, the combination, with a stationary section, a longitudinally-yielding section adapted to have its rear end elevated during its rearward movement, and a spring for controlling the movement of said yielding section, of a device for effecting the vertical yielding of the rear end only of said yielding section, and a spring for controlling said vertical yielding, said spring being of greater resistance than the first-mentioned spring; substantially as and for the purpose set forth.

In testimony whereof I affix my signature in presence of two witnesses.

CHARLES E. VAIL.

Witnesses:
   W. Jno. Littell,
   Lura E. Wells.